No. 888,357. PATENTED MAY 19, 1908.
G. W. SHOEMAKER.
STOVE LID.
APPLICATION FILED AUG. 13, 1907.
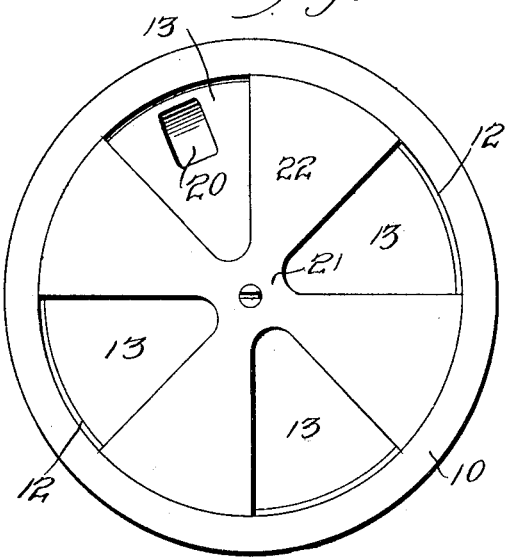
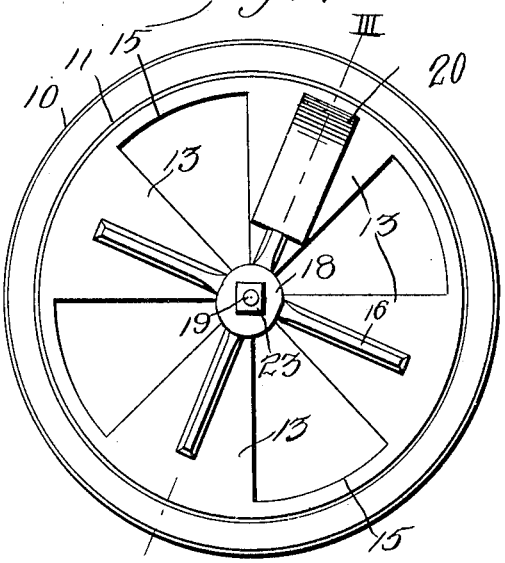
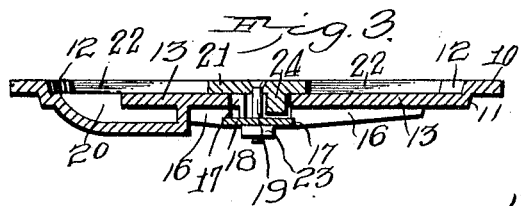
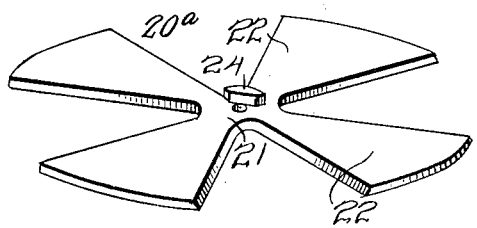
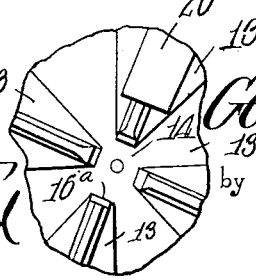
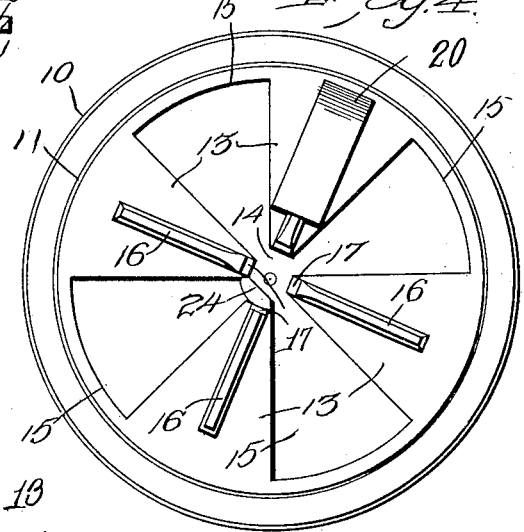
George W. Shoemaker
Inventor
Witnesses
by
Attorneys

UNITED STATES PATENT OFFICE.

GEORGE WASHINGTON SHOEMAKER, OF MONTROSE, PENNSYLVANIA.

STOVE-LID.

No. 888,357.     Specification of Letters Patent.     Patented May 19, 1908.

Application filed August 13, 1907. Serial No. 388,389.

*To all whom it may concern:*

Be it known that I, GEORGE W. SHOEMAKER, a citizen of the United States, residing at Montrose, in the county of Susquehanna and State of Pennsylvania, have invented a new and useful Stove-Lid, of which the following is a specification.

This invention relates to covers for the pot holes in stoves, and has for its object the production of a cover or lid which may be partially opened to permit the entrance of cold air to check the fire, or to permit the escape of a portion of the heat, and more particularly to the production of a lid or cover of this character which will not be affected by the heat to cause it to warp or twist out of shape.

The invention consists in a base member formed with a central opening and with converging radiating apertures leading therefrom, whereby alternating diverging imperforate projections are formed extending inward from the rim of the base member to the central opening, and a cover member having an imperforate central portion and radiating diverging imperforate portions corresponding to and adapted alternately to cover and uncover the radiating apertures in the base member.

The invention further consists in certain novel features of construction whereby the parts are united and supported, all as hereinafter shown and described, and specified in the claims.

In the drawings illustrative of the invention:—Figure 1 is a plan view, from the outside, of the improved device. Fig. 2 is a rear plan view of the same. Fig. 3 is a transverse section on the line III—III of Fig. 2. Fig. 4 is a rear plan view with the clamp plate removed. Fig. 5 is a perspective view, reversed, of the cover member detached. Fig. 6 is a fragmentary detail view of a portion of one of the parts of the device.

The cover or lid may be formed to fit any size of stove, and manufactured in graduated sizes for different sizes of pot holes, in the ordinary manner.

The improved device consists in an annular rim 10 having the usual marginal rabbet 11 on its underside to engage the pot hole in the stove, in the ordinary manner, the upper surface of the rim being provided with a circular recess 12, as shown.

Extending inwardly from the rim 10 are spaced projections 13, the upper faces of which are in alinement with the upper face of the recess, and converge toward the center of the rim and terminate at a central opening 14, as shown.

Alternating with the projections 13 are apertures 15, that radiate from the central opening, and diverge toward the rim, the apertures conforming in shape to the projections 13, and being commensurate in size therewith. The sides of the apertures and of the projections are in alinement transversely of the lid with the opposite apertures and projections, or in other words, the alternating projections and apertures are so disposed that their side lines all radiate from an imaginary central point in the aperture 14.

Formed upon the under sides of the projections 13 are supporting ribs 16, which serve to stiffen and strengthen the projections, and equalize the transverse area of the projections, so that the comparatively narrow inner ends of the projections will contain substantially the same amount of metal as the wider outer ends, and thus balance expansion and contraction.

The inner adjacent ends of the strengthening ribs 16 are formed with shoulders 17 adapted to support a clamp plate 18, as shown in Fig. 3, the clamp plate being provided with a central aperture to receive the clamp bolt 19. One of the projections 13 will be provided with the usual lifter cavity or socket 20.

Rotatively disposed within the rim 10 is a cover member 20ª formed with an imperforate central portion 21 adapted to form a permanent closure to the central portion 14, and having radiating members 22 extending therefrom and conforming in shape to but a trifle larger than the apertures 15, so that when placed in position and rotated, the radiating members will alternately cover and uncover the apertures, as will be obvious.

The members 22 are a trifle larger than the apertures 15, and will completely close the apertures when the rotating cover member is placed in one position, and then when reversed in position, the portions 22 will come above the imperforate portions 14, and thus form radiating openings through the cover or lid.

The clamp bolt 19 will engage the central portion 21, as shown in Fig. 3, so that when the nut 23 is set up, the parts will be suitably clamped together in relative operative position.

Projecting from the imperforate central portion 21 is a stop lug 24, so disposed that when the member 20ᵃ is rotated, the lug 24 will alternately engage the ends of two of the oppositely disposed ribs 16, as indicated in Fig. 4, and thus limit the movement, so that the imperforate portions 22 will not be moved too far in either direction.

It will be noted that to enable the lug 24 properly to operate, one of the projections 13 and its rib 16 will be shorter than the other projections at the inner ends, as shown at 16ᵃ, and the plate 18 is of sufficient diameter to compensate for this shortening of the parts and to cover the inner ends of all of the ribs, as will be obvious. By this arrangement it will be obvious that the projections 13 being unsupported at their inner ends, will not be affected deleteriously by the heat, but will yield to its influence, and contract and expand uniformly, and will not warp and twist out of shape, and the same is true of the cover member 20ᵃ embraced by the portions 21—22, as the imperforate members 22 are unsupported at their outer ends, and free to contract and expand without danger of twisting or warping out of shape. This is a very important feature of the invention, as it insures the continuous relative coaction of the parts, and prevents any tendency to displacement, or the formation of gaps between them by irregular warping or twisting.

As many of the alternating projections and apertures may be employed as required, but generally four of each will be used, as shown, but I do not wish to be limited to any specific number of these parts, as the increase or decrease of their numbers would not be a departure from the principle of the invention.

The parts may be of any size or thickness, and adapted to any size of stove, or other structure to which the device may be applied.

Having thus described the invention, what is claimed is:—

1. A stove lid comprising a rim having spaced imperforate converging projections extending therefrom toward a central opening whereby alternating diverging apertures are formed radiating from said central opening, and a cover plate formed with an imperforate central portion and spaced diverging imperforate members radiating therefrom and rotatively engaging said rim, whereby said apertures may be alternately covered and uncovered, substantially as described.

2. A stove lid comprising a rim having spaced imperforate projections extending therefrom and converging toward a central opening whereby alternating converging apertures are formed radiating from said central opening, reinforcing ribs formed upon said imperforate portions, and a cover plate formed with an imperforate central portion and spaced diverging imperforate members radiating therefrom and rotatively engaging said rim, substantially as described.

3. A stove lid comprising a rim recessed in its upper surface and having spaced imperforate projections extending inwardly therefrom in alinement with said recess and converging toward a central opening whereby alternating converging apertures are formed radiating from said central opening, and a cover plate formed with an imperforate central portion and diverging spaced imperforate members radiating therefrom and rotatively engaging said recessed surface, substantially as described.

4. A stove lid comprising a rim having spaced imperforate projections converging toward a central opening whereby alternating converging apertures are formed radiating from said central opening, reinforcing ribs formed upon the under sides of said imperforate portions and having shoulders upon their adjacent ends, a clamp plate engaging said shoulders and supported thereby, a cover plate formed with an imperforate central portion and diverging imperforate members radiating therefrom and rotatively engaging said rim, and a clamp screw connecting said cover plate and clamp plate through said central opening, substantially as described.

5. A stove lid comprising a rim having imperforate converging projections extending therefrom toward a central opening, whereby alternating diverging apertures are formed radiating from said central opening, a cover plate formed with an imperforate central portion and diverging imperforate members radiating therefrom and rotatively engaging said rim, and a stop lug extending from said cover member into said central opening, and adapted to alternately engage said imperforate projections and limit the movements of said cover member, substantially as described.

6. A stove lid consisting of a base member formed of an annular rim having spaced imperforate converging projections extending therefrom toward a central opening whereby alternating diverging apertures are formed radiating from said central opening, a cover plate formed with an imperforate central portion and diverging spaced imperforate members radiating therefrom and rotatively engaging said base member, and clasping means disposed to movably connect said base member and cover member, substantially as described.

7. A stove lid consisting of a base member formed of an annular rim having spaced imperforate converging projections extending therefrom toward a central opening, whereby alternating diverging apertures are formed radiating from said central opening, a cover plate formed with an imperforate central portion and spaced diverging imperforate members radiating therefrom and rotatively engaging said base member, a clamp plate engaging said base member, and a clamp screw connecting said clamp plate and cover member through said central aperture, substantially as described.

In testimony that I claim the foregoing as my own, I have hereto affixed my signature in the presence of two witnesses.

GEORGE WASHINGTON SHOEMAKER.

Witnesses:
VICTOR E. WENZEL,
LOUIS LA FONTAINE.